(12) United States Patent
Yu et al.

(10) Patent No.: US 10,772,368 B2
(45) Date of Patent: Sep. 15, 2020

(54) METHOD AND APPARATUS FOR MANUFACTURING A SILICA GEL GLOVE

(71) Applicants: Jie Yu, Taizhou (CN); Zhihui Wang, Taizhou (CN); Meng Nie, Taizhou (CN); Weibin Xu, Taizhou (CN); Haitao Li, Taizhou (CN)

(72) Inventors: Jie Yu, Taizhou (CN); Zhihui Wang, Taizhou (CN); Meng Nie, Taizhou (CN); Weibin Xu, Taizhou (CN); Haitao Li, Taizhou (CN)

(73) Assignee: ZHEJIANG EAST ASIA GLOVE CO., LTD. (CN)

(*) Notice: Subject to any disclaimer, the term of this patent is extended or adjusted under 35 U.S.C. 154(b) by 304 days.

(21) Appl. No.: 15/619,596

(22) Filed: Jun. 12, 2017

(65) Prior Publication Data
US 2018/0146725 A1    May 31, 2018

(30) Foreign Application Priority Data
Nov. 30, 2016  (CN) .......................... 2016 1 1079092

(51) Int. Cl.
*A41D 19/04*  (2006.01)
*A41D 19/00*  (2006.01)
(Continued)

(52) U.S. Cl.
CPC ......... *A41D 19/04* (2013.01); *A41D 19/0055* (2013.01); *B29C 35/02* (2013.01);
(Continued)

(58) Field of Classification Search
CPC ..... A41D 19/04; A41D 19/0055; B29C 35/02
(Continued)

(56) References Cited

U.S. PATENT DOCUMENTS 3,117,341 A * 1/1964 Abildgaard ............. B29C 41/14
264/303
4,390,492 A * 6/1983 Kurtz ...................... B29C 41/38
264/255
(Continued)

FOREIGN PATENT DOCUMENTS

CN        101632494 B  *  7/2012
CN        101632494 B     7/2012
(Continued)

OTHER PUBLICATIONS

Machine Translation JPH02235007 (Year: 1992).*
(Continued)

*Primary Examiner* — Matthew J Daniels
*Assistant Examiner* — Wayne K. Swier
(74) *Attorney, Agent, or Firm* — Aspire IP

(57) ABSTRACT

The method comprises of placing the palm side of a glove mold facing up, and raising the fingers portion of glove mold up, in such a way that the glove mold is tilting up at 15°-45° in relative to horizontal position. The first pouring process is carried out by pouring silica gel liquid on the fingers portion of glove mold. Then adjust the glove mold to horizontal position, and rotate the glove mold by using its length as axis. Continue pouring silica gel liquid on the glove mold surface to carry out second pouring process. Let the silica gel liquid to be coated on the whole glove mold surface forming a semi-finished glove. Upon completion, let the glove mold to go through a dripping procedure for dripping treatment. After the dripping treatment, carry out vulcanization and cooling to obtain the corresponding silica gel glove.

11 Claims, 2 Drawing Sheets

(51) Int. Cl.
*B29C 35/02* (2006.01)
*B29C 41/04* (2006.01)
*B29C 41/38* (2006.01)
*B29C 41/08* (2006.01)
B29L 31/48 (2006.01)
B29C 41/46 (2006.01)

(52) U.S. Cl.
CPC .......... *B29C 41/042* (2013.01); *B29C 41/085* (2013.01); *B29C 41/38* (2013.01); *B29C 41/46* (2013.01); *B29L 2031/4864* (2013.01)

(58) Field of Classification Search
USPC ........................................ 264/255, 215, 305
See application file for complete search history.

(56) References Cited

U.S. PATENT DOCUMENTS

| | | | | |
|---|---|---|---|---|
| 2005/0015846 | A1* | 1/2005 | Vistins | G01N 3/40 |
| | | | | 2/161.7 |
| 2011/0198777 | A1* | 8/2011 | Liou | B29C 41/085 |
| | | | | 264/209.2 |
| 2016/0374416 | A1* | 12/2016 | Wong | A41D 19/043 |
| | | | | 223/78 |

FOREIGN PATENT DOCUMENTS

| | | | | |
|---|---|---|---|---|
| CN | 103724857 | A | | 4/2014 |
| CN | 103923466 | A * | | 7/2014 |
| CN | 105295220 | A * | | 2/2016 |
| CN | 103923466 | B * | | 8/2016 |
| CN | 103923466 | B | | 8/2016 |
| DE | 3041906 | A1 * | 5/1981 | ............. A41D 19/04 |
| JP | 04235007 | A * | | 8/1992 |
| JP | H02-235007 | * | | 8/1992 |

OTHER PUBLICATIONS

Machine Translation JP-H0-235007A (Year: 1992).*
Machine Translation CN 105295220A (Year: 2016).*
Machine Translation CN 101632494B (Year: 2012).*
Machine Translation DE3041906 (Year: 1981).*
Machine Translation CN 103923466A (Year: 2014).*
Machine Translation JPH04235007 (Year: 1992).*
Machine Translation CN 105295220MT (Year: 2016).*
Machine Translation CN 103923466 (Year: 2016).*

* cited by examiner

METHOD AND APPARATUS FOR MANUFACTURING A SILICA GEL GLOVE

RELATED APPLICATIONS

This application claims benefit to Chinese Patent Application No. CN201611079092.2, filed Nov. 30, 2016.

The above applications and all patents, patent applications, articles, books, specifications, other publications, documents, and things referenced herein are hereby incorporated herein in their entirety for all purposes. To the extent of any inconsistency or conflict in the definition or use of a term between any of the incorporated publications, documents, or things and the text of the present document, the definition or use of the term in the present document shall prevail.

BACKGROUND OF THE INVENTION

Field of Invention

The present invention relates to the manufacturing method of a silica gel glove, and more particularly to the technical field of glove processing.

Related Art

Silica gel has excellent resistance to high and low temperatures. It is resistant to steaming, boiling, and steaming. It is environmental friendly, and remains stable and flexible in an environment up to 200° C. or above and as low as −50° C. or below. It is widely used in products for food contact, sealing of kitchen utensils, infant nipples, etc. Silica gel has been constantly applied in the field of gloves due to these excellent features. However, silica gel glove products in the existing market is mainly divided into two types in terms of production process: the first is the injection molding method, that is, injection of silica gel to the mold cavity in an injection molding machine, and to be released from mold after being vulcanized to shape. The process is relatively simple. However, the product has a poor performance to hand comfort, and its application is inconvenient. The second is to coat a uniform layer of silica gel on the surface of fabric with pouring and dipping methods and so on, and to be released from mold after vulcanization. The product has good performance to hand comfort and is convenient to use. It can also be used in combination with functional lining, so that the gloves can have features such as cold resistance, heat insulation, cut resistance and puncture proof, etc., but the production process is complex, with large consumption of gel materials, poor uniformity in thickness and low yield rate. The corresponding product in the market is scarce and the cost is expensive. In order to overcome some of the above problems, there are also some conventional methods of preparation of silica gel gloves by pouring and dipping that comprise the use of polyorganosiloxane mixture as a raw material, and a glove is prepared by pouring and/or immersion method, followed by vulcanization treatment, mold released after cooling, trimming and packaging to obtain a corresponding silica gel glove. Further, the specific process of pouring operation is specifically disclosed in the embodiments. The glove lining is put on a ceramic glove mold, and then immersed in an environmentally friendly, waterproof and oil resistant agent with a mass fraction of 3% for 1 min, then taken out and dried in an oven. When the temperature of mold covered with glove lining is cooled to 50° C., the first pouring is carried out by using organosiloxane mixture, and the mold is placed vertically for further dripping for 3-5 min, and then vulcanization is carried out while rotating the mold horizontally at 100° C. for 10 min to form a silica gel coating. After cooling, the second pouring is carried out, and then the mold is placed vertically for dripping for 2-4 min, and then vulcanization is carried out again while rotating the mold horizontally at 120° C. for 30 min to form a silica gel coating. Then it is released from mold after cooling, trimmed and packed to obtain the corresponding silica gel glove. The process is relatively simple by processing the silica gel glove by means of pouring. However, due to the poor flowability of silica gel, the yield rate is assured by the use of twice pouring method. As the finger-palm joints and the thumb-palm joint of glove are relatively secluded, it is difficult to ensure a uniform thickness and homogeneity of the pouring, so it is easily damaged while in use, and bubbles get in the silica gel slurry easily during pouring, causing problems such as bumpy surface of the gloves and poor finishing which affect the quality of products.

SUMMARY OF THE INVENTION

In view of the above-mentioned drawbacks of the prior art, one embodiment of the present invention provides a method for producing silica gel glove. Some problems to be solved are how to improve the uniformity of the glove thickness and the yield rate of finished products.

The objective of one embodiment of present invention is to provide the making method of a silica gel glove, which can be achieved by the following technical solutions, characterized in that, the method comprises the following steps:

A. Pouring procedure: placing the palm side of a glove mold facing up, and raising the fingers portion of glove mold up, in such a way that the glove mold is tilting up at 15°-45° relative to horizontal position. The first pouring process is carried out by pouring silica gel slurry on the fingers portion of glove mold. Then adjust the glove mold to horizontal position, and rotate the glove mold axially. Continue pouring silica gel slurry on the glove mold surface to carry out second pouring. Let the silica gel slurry be coated on the whole glove mold forming a semi-finished glove.

B. Dripping procedure: Upon completion of the pouring procedure, let the glove mold go through a dripping procedure for dripping treatment.

C. Vulcanization procedure: After the dripping treatment, carry out vulcanization and cooling to obtain the corresponding silica gel glove.

One method of the present invention is to place the palm side of a glove mold facing up, and raising the fingers portion of glove mold up, in such a way that the glove mold is tilting up at 15°-45° relative to horizontal position. One purpose is to let the lengthwise direction of the glove mold tilt with a certain angle relative to the horizontal position, so that the silica gel slurry being poured on the fingers portion of glove mold can flow to the finger-palm joints and thumb-palm joint of glove mold under the action of gravity force, causing the finger-palm joints and thumb-palm joint to be covered first with silica gel slurry, thus capable of effectively solve the problem of dead angle appearing at the finger-palm joints and the thumb-palm joint. Therefore, the silica gel slurry can be uniformly distributed in these locations to ensure thickness requirements being met, so that the problem of uneven thickness does not appear. Then, with the combination of adjusting the glove mold to horizontal position and rotating in on its own axial direction, under the action of gravity force and own axial rotation of glove mold, the silica gel slurry can be distributed uniformly on the glove mold surface in the course of pouring, so that the eventually obtained silica gel glove has an uniform overall thickness, and can ensure that the thickness requirements at finger-palm joints and thumb-palm joint will be met, so that the phenomenon of dead angle will not appear, thus improving the finished product yield rate performance of silica gel gloves.

In one embodiment of the above-mentioned method of making silica gel glove, preferably, the first pouring in step A is specifically:

The silica gel slurry is poured at the finger-palm joints and the thumb-palm joint on the fingers portion of glove mold, and the silica gel slurry is being poured downwards like a waterfall. Due to the relatively poor flowability of silica gel slurry, in order to avoid the problem of skipped flowing during the flowing process, the silica gel slurry can be poured directly onto the joints and thumb-palm joint and using the waterfall-like pouring method, which is capable of pouring silica gel slurry on the corresponding joints and thumb-palm joint in sheet form, resulting in the silica gel slurry being effectively coated onto the joints and thumb-palm joint, and the phenomenon of dead angle will not appear, hence ensuring that the thickness requirements at joints and thumb-palm joint will be met. By a combination of follow-up horizontal position and means of rotating on its own axial direction, the advantage of uniform distribution of glove thickness will be achieved.

In one embodiment of the above-mentioned method of making silica gel glove, preferably, the dripping treatment in step B is specifically:

Placing the fingers portion of glove mold downwards in an off-horizontal position, in such a way that the glove mold forms an angle of 40°-75° with the horizontal direction, and dripping is carried out while rotating the glove mold using its lengthwise direction as axis. The purpose of tilting the glove mold downwards is to allow the silica gel slurry coated on the glove mold to flow to the finger end positions, so that the silica gel slurry at the finger end positions can be re-distributed, and hence the thickness at the finger end positions can be further assured. A more specific thickness requirement can be achieved, as well as to make the excess silica gel slurry to drip along the finger end. At the same time, the formation of an angle of 40°-75° is to prevent too much of the silica gel slurry coated on the finger-palm joints and the thumb-palm joint to flow away during the dripping process, thus ensuring the thickness requirements are being met. In addition, during the dripping process, the axial rotation of glove mold itself can also make the glove surface to have a better uniformity. The phenomenon of bumpiness will not occur, thus ensuring that the surface finishing requirements of the glove is achieved.

In one embodiment of the above-mentioned method of making silica gel glove, preferably, after the dripping procedure in step B, it also includes the adjusting of glove mold to its horizontal position, and blowing compressed air to the semi-finished glove on the surface of glove mold, in such a way that the compressed air blowing direction is perpendicular to the lengthwise direction of glove mold, and the glove mold rotates using its lengthwise direction as axis. As air bubbles will be mingled with the silica gel slurry in the pouring process, bumpy rough surface will be generated, thus affecting the surface finishing requirements of glove. Therefore, the purpose of compressed air blowing is to blowup the mingled air bubbles, and effectively remove the formation of bumpy surface, achieving good surface finishing effect of the produced glove, and the self-rotation of glove mold can make the thickness of gloves to become more uniform.

In one embodiment of the above-mentioned method of making silica gel glove, preferably, prior to the vulcanization treatment in step C, it also includes placing the fingers portion of glove mold upwards in an off-horizontal position, in such a way that the glove mold tilts upward and form an angle of 5°-15° with the horizontal position. This is to make the fingers portion of glove mold to tilt upwards at a certain angle, so that the silica gel slurry can have a backward flow process. On the one hand, this is to supplement, during the dripping process, the tilting of the glove mold downwards at a certain angle, so that the thickness of gloves can become more uniform. On the other hand, this can further remove the residual air bubbles which may exist in the silica gel slurry, so that the produced glove has a better effect in surface finishing.

In one embodiment of the above-mentioned method of making silica gel glove, preferably, the pouring temperature of silica gel slurry is ≤40° C. It is equivalent to making the temperature of silica gel slurry at ≤40° C. when performing pouring. This enables the silica gel slurry to have a certain flowability in the process of pouring, so that the silica gel slurry can flow downwards pouring continuously without interruption, so as to ensure the uniformity of pouring. Thus, more preferably, the temperature of silica gel slurry is 10° C.-40° C. If the temperature is too low, the viscosity of silica gel will increase, thus affecting the operability and operating time, which is not favorable to improving production efficiency.

In one embodiment of the above-mentioned method of making silica gel glove, preferably, the viscosity of silica gel slurry is 2000 mPa·s-20000 mPa·s. The purpose is to enable the silica gel slurry to have a certain viscosity, so that it can be better coated on the glove mold in the process of pouring and dripping. Further, the uniformity of thickness and better surface finishing requirement can be assured by the removal of overdone portions through dripping.

In one embodiment of the above-mentioned method of making silica gel glove, preferably, the glove mold in step A is firstly covered with a glove lining, then immerse the glove mold covered with glove lining in an anti-permeation liquid for anti-permeation treatment, then enters into the next procedure after drying. An isolation effect can be achieved, which is more favorable to mold release, and a more comfortable wearing effect and higher strength performance can be obtained by the provision of glove lining.

As a summary of the above, one embodiment of the present invention has the following advantages over the prior art:

1. In the method for producing silica gel glove, by placing the palm side of a glove mold facing up, and raising the fingers portion of glove mold up, in such a way that the glove mold is tilting up at 15°-45° relative to horizontal position, can effectively solve the problem of dead angle appearing at the finger-palm joints and the thumb-palm joint. Thus, the silica gel slurry can be uniformly distributed in these positions, to achieve the effect of a uniform distribution of thickness.

2. In the method for producing silica gel glove, by the adjustment of glove mold to horizontal position and rotates on its own axial direction, under the action of gravity force and its own axial rotation of glove mold, the silica gel slurry can be distribute uniformly on the glove mold surface in the course of pouring, ensuring that the thickness requirements at finger-palm joints and thumb-palm joint will be met, so that the phenomenon of dead angle will not appear, thus improving the finished product yield rate requirements of silica gel gloves, and achieving uniform thickness effect.

3. In the method for producing silica gel glove, by blowing compressed air perpendicularly to the lengthwise direction of glove mold to blow up the mingled air bubbles, the formation of bumpy surface can be removed effectively, and good surface finishing effect of the produced glove can be achieved.

4. In the method for producing silica gel glove, tilting the glove mold downwards during the dripping process and tilting the glove mold upwards at a certain angle prior to vulcanization can achieve a uniform thickness at finger-palm joints and thumb-palm joint of the produced glove, so that the phenomenon of dead angle will not appear, thus assuring the finished product yield rate requirements, and equivalent to the advantage of reducing production cost by improving yield rate of finished product.

DETAILED DESCRIPTION OF THE INVENTION

By the following specific embodiments and accompanied figures, the technical solution of present invention will be more specifically described, but the present invention is not limited to these embodiments.

The raw material of silica gel slurry used in the following embodiments may be a conventional raw material, and the raw material of silica gel may be a polyorganosiloxane mixture. The mixture comprises of a polyorganosiloxane containing a vinyl group and a polyorganosiloxane containing Si—H bond. Further, if possible, the polyorganosiloxane mixture disclosed in Chinese Patent Publication No. CN103923466B may be used as the raw material of silica gel slurry. The composition of each component in the raw material or whether to add any pigment can be adjusted according to the actual needs.

Embodiment 1

Figure 1:
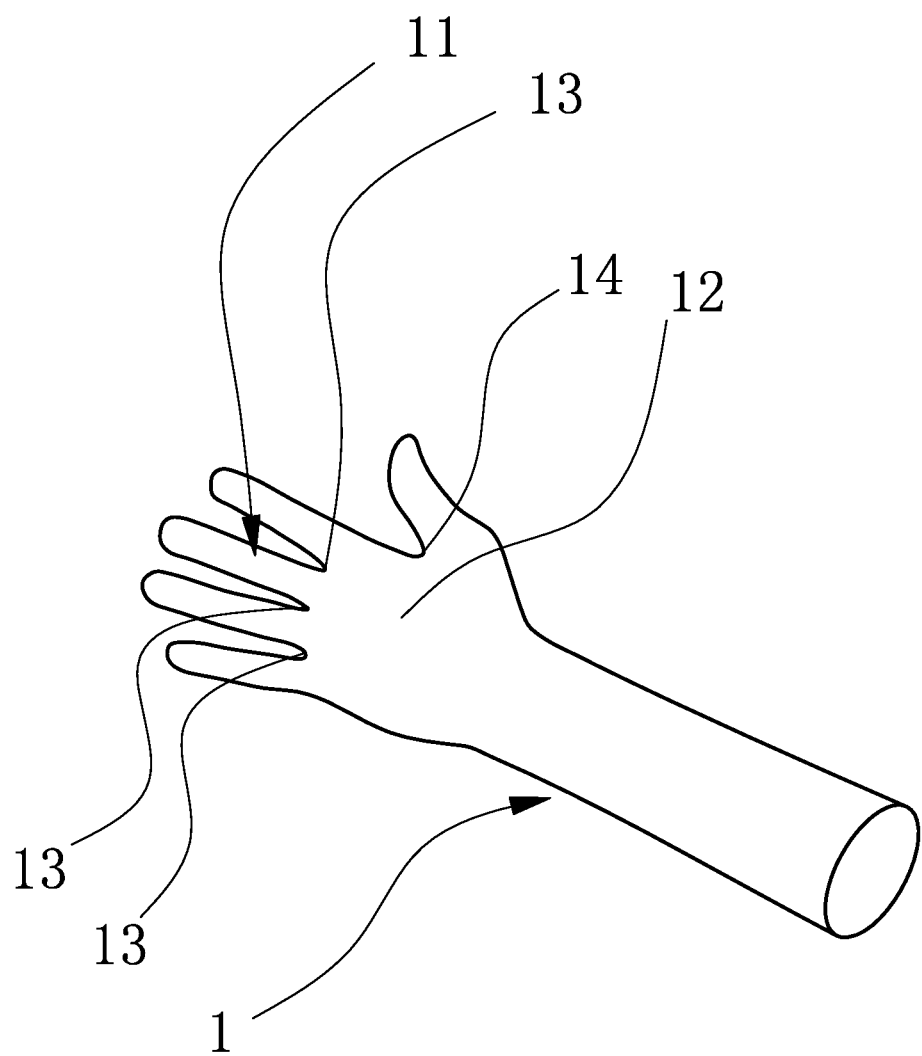
FIG. 1 is a schematic perspective view of the glove mold in this making method of silica gel glove.
Figure 2:
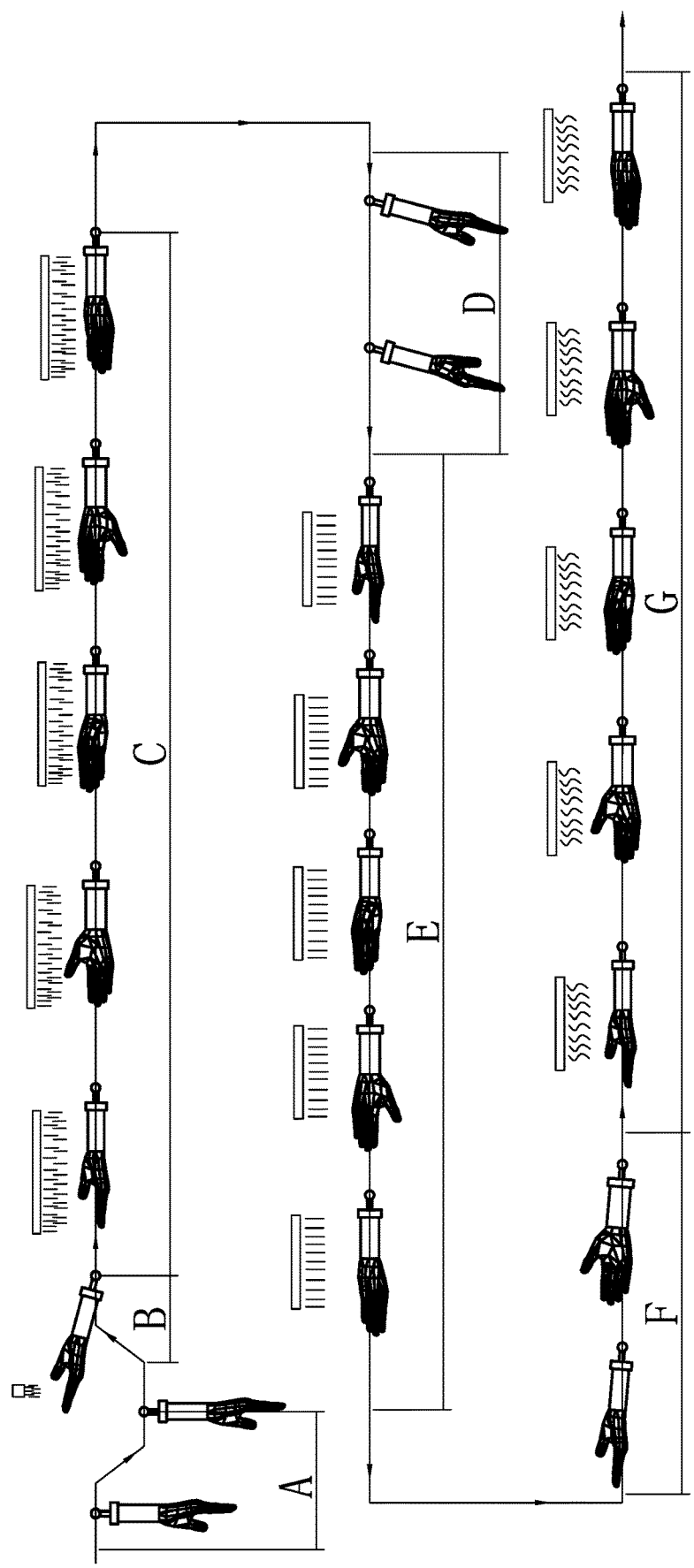
FIG. 2 shows, from the beginning to the end, the tilting state of the glove mold in this making method of silica gel glove.

One method of making silica gel glove in this embodiment is as follow:

In conjunction with what is shown in FIG. 1, put the glove lining on the glove mold 1, then, as shown in part A of FIG. 2, fix the glove mold 1 on the fixture in production line, in such a way that the glove mold 1 is facing vertically downwards, moving forward with the production line, so that the glove mold 1 covered with glove lining is immersed in the anti-permeation liquid right underneath. The whole glove lining is being completely immersed in anti-permeation liquid for anti-permeation treatment for 1 min, wherein, an anti-permeation liquid of environmentally friendly, waterproof and oil resistant agent with a mass fraction of 3 wt % is used. The glove mold 1 is then moved forward out of the anti-permeation liquid, and enters the drying region of production line, to carry out drying under a temperature condition of 150° C. for 1 min, then is let cooled and moves with the production line to enter the next procedure.

Prior to the pouring procedure, the position of glove mold 1 is being adjusted automatically by the production line, as shown in part B of FIG. 2, placing the palm side 12 of glove mold 1 facing up, and back side of glove mold 1 facing down, raising the fingers portion 11 of glove mold 1 up, in such a way that the glove mold 1 is tilting up at 15° relative to horizontal position. In other words, the lengthwise direction of glove mold 1 forms an angle of 15° relative to the horizontal position. The above-mentioned adjustment of glove mold 1 is completed in its forward moving process. Then, the glove mold 1 moves forward with the production line and enters the pouring procedure. The first pouring is carried out by pouring silica gel slurry on the fingers portion 11 of glove mold 1, and the silica gel slurry is being poured downwards like a waterfall during the pouring process. Then adjust the glove mold 1 to horizontal position, so the lengthwise direction of glove mold 1 is parallel with horizontal direction. The glove mold does not rotate during the first pouring. As shown in part C of FIG. 2, allow the glove mold 1 to continue moving forward and rotate the glove mold 1 using its lengthwise direction as axis. Continue pouring silica gel slurry on the whole surface of glove mold 1 to carry out second pouring. Let the silica gel slurry be coated on the entire anti-permeation lining surface of glove mold 1 to form a semi-finished glove. Upon completion of the pouring procedure, as shown in parts D~G of FIG. 2, let the glove mold 1 to continue moving forward and carry out dripping, vulcanization, and cooling. And, then, carry out trimming and packaging to obtain the corresponding silica gel glove.

The obtained silica gel gloves are tested for corresponding performance. The test results showed that, the thickness of silica gel gloves are uniformly distributed. The problem of uneven thickness at the finger-palm joints and thumb-palm joint does not appear, and a higher yield of more than 98% is obtained.

Embodiment 2

One method of making silica gel glove in this embodiment is as follow:

In conjunction with what is shown in FIG. 1, put the glove lining on the glove mold 1, then, fix the glove mold 1 on the fixture in production line, preferably fixing the rear end of glove mold 1 (in the sense that the fingers portion 11 is regarded as the front end), in such a way that the glove mold 1 is facing vertically downwards, moving forward with the production line, so that the glove mold 1 covered with glove lining is immersed in the anti-permeation liquid right underneath. The whole glove lining is being completely immersed in anti-permeation liquid for anti-permeation treatment for 1 min, wherein, an anti-permeation liquid of environmentally friendly, waterproof and oil resistant agent with a mass fraction of 3 wt % is used. The glove mold is then moved forward out of the anti-permeation liquid, and enters the drying region of production line, to carry out drying under a temperature condition of 150° C. for 1 min, then let cooled and moves with the production line to enter the next procedure.

Prior to the pouring procedure, the position of glove mold 1 is being adjusted automatically by the production line, placing the palm side 12 of glove mold 1 facing up, and back side of glove mold 1 facing down, raising the fingers portion 11 of glove mold 1 up, in such a way that the glove mold 1 is tilting up at 45° relative to horizontal position. In other words, the lengthwise direction of glove mold 1 forms an angle of 45° relative to the horizontal position. The above-mentioned adjustment of glove mold 1 is completed in its forward moving process. Then, the glove mold 1 moves forward with the production line and enters the pouring procedure. The first pouring is carried out by pouring silica gel slurry on the finger-palm joints 13 and the thumb-palm joint 14 on the fingers portion 11 of glove mold 1, and the silica gel slurry is being poured downwards like a waterfall. The glove mold 1 rotates taking its lengthwise direction as axis during the first pouring. Then adjust the glove mold 1 to horizontal position, so the lengthwise direction of glove mold 1 is parallel with horizontal direction. Allow the glove mold 1 to continue moving forward and rotate the glove mold 1 by using its lengthwise direction as axis (equivalent to self spinning). Continue pouring silica gel slurry on the whole surface of glove mold 1 to carry out second pouring. Let the silica gel slurry be coated on the glove lining of entire glove mold 1 to form a semi-finished glove. Upon completion of the pouring procedure, as shown in part D of FIG. 2, place the fingers portion 11 of glove mold 1 downwards in an off-horizontal position, in such a way that the glove mold 1 forms an angle of 75° with the horizontal direction, i.e. the lengthwise direction of glove mold 1 forms an angle of 75° relative to the horizontal position. Keep rotating the glove mold 1 in axial direction. Let the glove mold 1 to continue moving forward with production line and carry out dripping treatment for 5 min. After the dripping procedure, as shown in part E of FIG. 2, readjust the glove mold 1 to its horizontal position and maintain axial rotation. Blow the semi-finished glove on the surface of glove mold 1 with compressed air for 2 min. During the air blowing process, the compressed air blowing direction is perpendicular to the lengthwise direction of glove mold 1, and the glove mold 1 keeps rotating during the air blowing process. The purpose is to blowup the mingled air bubbles in pouring process, to improve the surface finishing of glove. As the production line moves forward and after the air blowing treatment, readjust the position of glove mold 1, as shown in part F of FIG. 2, by placing the fingers portion 11 of glove mold 1 upwards in an off-horizontal position, in such a way that the glove mold 1 forms an upward tilting angle of 5° with the horizontal direction, and maintain axial rotation for 5 min. Then return the glove mold 1 to horizontal position, as shown in part G of FIG. 2, and move forward with production line to enter the dryer. Control the temperature at 150° C. to carry out vulcanization for 5 min. Keep the glove mold 1 in horizontal position and rotates axially during the vulcanization process. After cooling, silica gel glove is released from mold. Carry out trimming and packaging to obtain the corresponding finished product of silica gel glove.

The obtained silica gel gloves are tested for corresponding performance. The test results showed that, the thickness of silica gel gloves are uniformly distributed. The problem of uneven thickness at the finger-palm joints and thumb-palm joint does not appear, there is no defect of bumpy surface, the surface finishing is of high quality, and a higher yield of more than 99% is obtained.

Embodiment 3

One method of making silica gel glove in this embodiment is as follow:

In conjunction with what is shown in FIG. 1, after the anti-permeation procedure of this embodiment is carried out by following the processing method in embodiment 1, then, it moves forward with the production line to enter the next procedure.

Prior to the pouring procedure, the position of glove mold 1 is being adjusted automatically by the production line, placing the palm side 12 of glove mold 1 facing up, and back side of glove mold 1 facing down, raising the fingers portion 11 of glove mold 1 up, in such a way that the glove mold 1 is tilting up at 30° relative to horizontal position. In other words, the lengthwise direction of glove mold 1 forms an angle of 30° relative to the horizontal position. The above-mentioned adjustment of glove mold 1 is completed in its forward moving process. Then, the glove mold 1 moves forward with the production line and enters the pouring procedure. The first pouring is carried out by pouring silica gel slurry of viscosity 2000 mPa·s directly on the finger-palm joints 13 and the thumb-palm joint 14 on the fingers portion 11 of glove mold 1, and the silica gel slurry is being poured downwards like a waterfall. Control the pouring temperature of silica gel slurry at below 40° C. The glove mold 1 does not rotate during the first pouring. Then adjust the glove mold 1 to horizontal position, so the lengthwise direction of glove mold 1 is parallel with horizontal direction. Allow the glove mold 1 to continue moving forward and rotate the glove mold 1 using its lengthwise direction as axis. Continue pouring silica gel slurry on the whole surface of glove mold 1 to carry out second pouring. Let the silica gel slurry be coated on the glove lining of entire glove mold 1 to form a semi-finished glove. Upon completion of the pouring procedure, place the fingers portion 11 of glove mold 1 downwards in an off-horizontal position, in such a way that the glove mold 1 forms an angle of 40° with the horizontal direction, i.e. the lengthwise direction of glove mold 1 forms an angle of 40° relative to the horizontal position. Keep rotating the glove mold 1, and let it continue to move forward with production line and carry out dripping treatment for 10 min. After the dripping procedure, readjust the glove mold 1 to its horizontal position and maintain the rotation. Blow the semi-finished glove on the surface of glove mold 1 with compressed air for 2 min. During the air blowing process, the compressed air blowing direction is perpendicular to the lengthwise direction of glove mold 1, and the glove mold keeps rotating during the air blowing process. The purpose is to blow up the mingled air bubbles in pouring process, to improve the surface finishing of glove. As the production line moves forward and after the air blowing treatment, readjust the position of glove mold 1 by placing the fingers portion 11 of glove mold 1 upwards in an off-horizontal position, in such a way that the glove mold 1 forms an upward tilting angle of 15° with the horizontal position, and maintain rotation for 5 min. Then return the glove mold 1 to horizontal position, and move forward with production line to enter the dryer. Control the temperature at 150° C. to carry out vulcanization for 5 min. Keep the glove mold 1 in horizontal position and rotates axially during the vulcanization process. After cooling, silica gel glove is released from mold. Carry out trimming and packaging to obtain the corresponding finished product of silica gel glove.

The obtained silica gel gloves are tested for corresponding performance. The test results showed that, the thickness of silica gel gloves are uniformly distributed. The problem of uneven thickness at the finger-palm joints and thumb-palm joint does not appear, there is no defect of bumpy surface, the surface finishing is of high quality, and a higher yield of more than 99% is obtained.

Embodiment 4

After the anti-permeation procedure of Embodiment 1, then, it moves forward with the production line to enter the next procedure:

In conjunction with what is shown in FIG. 1, prior to the pouring procedure, the position of glove mold 1 is being adjusted automatically by the production line, placing the palm side 12 of glove mold 1 facing up, and back side of glove mold 1 facing down, raising the fingers portion 11 of glove mold 1 up, in such a way that the glove mold 1 is tilting up at 20° relative to horizontal position. In other words, the lengthwise direction of glove mold 1 forms an angle of 20° relative to the horizontal position. The above-mentioned adjustment of glove mold 1 is completed in its forward moving process. Then, the glove mold 1 moves forward with the production line and enters the pouring procedure. The first pouring is carried out by pouring silica gel slurry of viscosity 10000 mPa·s directly on the finger-palm joints 13 and the thumb-palm joint 14 on the fingers portion 11 of glove mold 1, and the silica gel slurry is being poured downwards like a waterfall, which is equivalent to making the shape of pouring holes in long strip form, so that pouring can be carried out by pouring out the silica gel slurry like a waterfall. Control the pouring temperature of silica gel slurry at 35° C. The glove mold 1 does not rotate axially during the first pouring. Then adjust the glove mold 1 to horizontal position, so the lengthwise direction of glove mold 1 is parallel with horizontal position. Allow the glove mold 1 to continue moving forward and let the glove mold 1 to keep rotating axially. Continue pouring silica gel slurry on the whole surface of glove mold 1 to carry out second pouring. Let the silica gel slurry be coated on the glove lining of entire glove mold 1 to form a semi-finished glove. Upon completion of the pouring procedure, place the fingers portion 11 of glove mold 1 downwards in an off-horizontal position, in such a way that the glove mold 1 forms an angle of 50° with the horizontal direction, i.e. the lengthwise direction of glove mold 1 forms an angle of 50° relative to the horizontal direction. Keep rotating the glove mold 1, and let it continue to move forward with production line and carry out dripping treatment for 5 min. After the dripping procedure, readjust the glove mold 1 to its horizontal position and maintain the rotation. Blow the semi-finished glove on the surface of glove mold 1 with compressed air for 2 min. During the air blowing process, the compressed air blowing direction is perpendicular to the lengthwise direction of glove mold 1, and the glove mold keeps rotating during the air blowing process. As the production line moves forward and after the air blowing treatment, readjust the position of glove mold 1 by placing the fingers portion 11 of glove mold 1 upwards in an off-horizontal position, in such a way that the glove mold 1 forms an upward tilting angle of 10° with the horizontal position, and maintain axial rotation for 3 min. Then return the glove mold 1 to horizontal position, and maintain axial rotation. Let it moves forward with production line to enter the dryer. Control the temperature at 150° C. to carry out vulcanization for 5 min. Keep the glove mold 1 in horizontal position and rotates axially during the vulcanization process. After cooling, silica gel glove is released from mold. Carry out trimming and packaging to obtain the corresponding finished product of silica gel glove.

The obtained silica gel gloves are tested for corresponding performance. The test results showed that, the thickness of silica gel gloves are uniformly distributed. The problem of uneven thickness at the finger-palm joints and thumb-palm joint does not appear, there is no defect of bumpy surface, the surface finishing is of high quality, and a higher yield of more than 99% is obtained.

Embodiment 5

After the anti-permeation procedure of Embodiment 1, then, it moves forward with the production line to enter the next procedure:

In conjunction with what is shown in FIG. 1, prior to the pouring procedure, the position of glove mold 1 is being adjusted automatically by the production line, placing the palm side 12 of glove mold 1 facing up, and back side of glove mold 1 facing down, raising the fingers portion 11 of glove mold 1 up, in such a way that the glove mold 1 is tilting up at 25° relative to horizontal position. In other words, the lengthwise direction of glove mold 1 forms an angle of 25° relative to the horizontal position. The above-mentioned adjustment of glove mold 1 is completed in its forward moving process. Then, the glove mold 1 moves forward with the production line and enters the pouring procedure. The first pouring is carried out by pouring silica gel slurry of viscosity 20000 mPa·s directly on the finger-palm joints 13 and the thumb-palm joint 14 on the fingers portion 11 of glove mold 1, and the silica gel slurry is being poured downwards like a waterfall. Control the pouring temperature of silica gel slurry at 30° C. The glove mold 1 does not rotate axially during the first pouring. Then adjust the glove mold 1 to horizontal position, so the lengthwise direction of glove mold 1 is parallel with horizontal position. Allow the glove mold 1 to continue moving forward and let the glove mold 1 to keep rotating. Continue pouring silica gel slurry on the whole surface of glove mold 1 to carry out second pouring. Let the silica gel slurry be coated on the glove lining of entire glove mold 1 to form a semi-finished glove. Upon completion of the pouring procedure, place the fingers portion 11 of glove mold 1 downwards in an off-horizontal position, in such a way that the glove mold 1 forms an angle of 60° with the horizontal direction, i.e. the lengthwise direction of glove mold 1 forms an angle of 60° relative to the horizontal direction. Keep rotating the glove mold 1, and let it continue to move forward with production line and carry out dripping treatment for 10 min. After the dripping procedure, readjust the glove mold 1 to its horizontal position and maintain the axial rotation. Blow the semi-finished glove on the surface of glove mold 1 with compressed air for 2 min. During the air blowing process, the compressed air blowing direction is perpendicular to the lengthwise direction of glove mold 1, and the glove mold keeps rotating. As the production line moves forward and after the air blowing treatment, readjust the position of glove mold 1 by placing the fingers portion 11 of glove mold 1 upwards in an off-horizontal position, in such a way that the glove mold 1 forms an upward tilting angle of 15° with the horizontal position, and maintain axial rotation for 5 min. Then return the glove mold 1 to horizontal position, and maintain the rotation. Let it moves forward with production line to enter the dryer. Control the temperature of dryer in the first half section at 200° C.-160° C., i.e. the inlet temperature of first half section of dryer is set at 200° C., and outlet temperature at 160° C., and the temperature in first half section of dryer shows a process of descending gradient. Vulcanization is carried out for 2 min in first half section of dryer, and then enters second half section of dryer to continue vulcanization for 3 min, wherein, the temperature of dryer in the second half section is controlled at 160° C.-100° C., i.e. the inlet temperature of second half section of dryer (equivalently, the outlet temperature of the first half section of dryer) is set at 160° C., and outlet temperature at 100° C., and the temperature in second half section of dryer shows a process of descending gradient. Keep the glove mold 1 in horizontal position and in rotating condition during the whole vulcanization process. After vulcanization and cooling, silica gel glove is released from mold. Carry out trimming and packaging to obtain the corresponding finished product of silica gel glove.

The obtained silica gel gloves are tested for corresponding performance. The test results showed that, the thickness of silica gel gloves are uniformly distributed. The problem of uneven thickness at the finger-palm joints and thumb-palm joint does not appear, there is no defect of bumpy surface, the surface finishing is of high quality, and a higher yield of more than 99% is obtained.

Embodiment 6

One manufacturing method of silica gel glove of this embodiment is similar to Embodiment 4 except that the anti-permeation procedure is different. One anti-permeation procedure of present embodiment is as follows:

In conjunction with what is shown in FIG. 1, fix the glove mold 1 directly on the fixture in production line, then put the glove lining on the glove mold 1, and let the glove mold 1 to face vertically downwards, moving forward with the production line, so that the glove mold 1 covered with glove lining is immersed in the anti-permeation liquid right underneath. The whole glove lining is being completely immersed in anti-permeation liquid for anti-permeation treatment for 1 min, wherein, an anti-permeation liquid of environmentally friendly, waterproof and oil resistant agent with a mass fraction of 3 wt % is used. The glove mold 1 is then moved forward out of the anti-permeation liquid, and enters the drying region of production line, to carry out drying under a temperature condition of 150° C. for 1 min, then let cooled and moves with the production line to enter the next procedure. The subsequent specific process is consistent with that in Embodiment 4, and will not be repeated here. Eventually the corresponding silica gel glove is obtained.

The obtained silica gel gloves are tested for corresponding performance. The test results showed that, the thickness of silica gel gloves are uniformly distributed. The problem of uneven thickness at the finger-palm joints and thumb-palm joint does not appear, there is no defect of bumpy surface, the surface finishing is of high quality, and a higher yield of more than 99% is obtained.

Embodiment 7

One manufacturing method of silica gel glove of this embodiment is similar to Embodiment 4. One difference is, no anti-permeation procedure treatment is necessary, detailed as follows:

In conjunction with what is shown in FIG. 1, fix the glove mold 1 directly on the fixture in production line, then carry out pouring procedure without putting the glove lining on, and the specific pouring procedure and subsequent specific process is consistent with that in Embodiment 4, and will not be repeated here. Eventually the corresponding silica gel glove is obtained.

The obtained silica gel gloves are tested for corresponding performance. The test results showed that, the thickness of silica gel gloves are uniformly distributed. The problem of uneven thickness at the finger-palm joints and thumb-palm joint does not appear, there is no defect of bumpy surface, the surface finishing is of high quality, and a higher yield of more than 99% is obtained.

Comparative Example 1

This comparative example is mainly to illustrate the effect of compressed air blowing treatment on the surface finishing of silica gel glove. The description is carried out by omitting this step, and one manufacturing method is as follows:

The anti-permeation procedure of this comparative example is carried out in accordance with the processing method of Embodiment 1, and moves along with production line into the next procedure.

In conjunction with what is shown in FIG. 1, prior to the pouring procedure, the position of glove mold 1 is being adjusted automatically by the production line, placing the palm side 12 of glove mold 1 facing up, and back side of glove mold 1 facing down, raising the fingers portion 11 of glove mold 1 up, in such a way that the glove mold 1 is tilting up at 20° relative to horizontal position. In other words, the lengthwise direction of glove mold 1 forms an angle of 20° relative to the horizontal direction. The above-mentioned adjustment of glove mold 1 is completed in its forward moving process. Then, the glove mold 1 moves forward with the production line and enters the pouring procedure. The first pouring is carried out by pouring silica gel slurry of viscosity 10000 mPa·s directly on the finger-palm joints 13 and the thumb-palm joint 14 on the fingers portion 11 of glove mold 1, and the silica gel slurry is being poured downwards like a waterfall, which is equivalent to making the shape of pouring holes in long strip form, so that pouring can be carried out by pouring out the silica gel slurry like a waterfall. Control the pouring temperature of silica gel slurry at 35° C. The glove mold 1 does not rotate axially during the first pouring. Then adjust the glove mold 1 to horizontal position, so the lengthwise direction of glove mold 1 is parallel with horizontal position. Allow the glove mold 1 to continue moving forward and let the glove mold 1 to rotate using its lengthwise direction as axis. Continue pouring silica gel slurry on the whole surface of glove mold 1 to carry out second pouring. Let the silica gel slurry be coated on the glove lining of entire glove mold 1 to form a semi-finished glove. Upon completion of the pouring procedure, place the fingers portion 11 of glove mold 1 downwards in an off-horizontal position, in such a way that the glove mold 1 forms an angle of 50° with the horizontal direction, i.e. the lengthwise direction of glove mold 1 forms an angle of 50° relative to the horizontal direction. Keep rotating the glove mold 1 axially, and let it continue to move forward with production line and carry out dripping treatment for 5 min. After the dripping procedure, directly readjust the glove mold position without going through compressed air blowing treatment procedure. Placing the fingers portion 11 of glove mold 1 upwards in an off-horizontal position, in such a way that the glove mold 1 forms an upward tilting angle of 10° with the horizontal position, and maintain axial rotation for 3 min. Then return the glove mold 1 to horizontal position, and maintain the rotation. Let it move forward with production line to enter the dryer. Control the temperature at 150° C. to carry out vulcanization for 5 min. Keep the glove mold 1 in horizontal position and keep rotating during the vulcanization process. After cooling, silica gel glove is released from mold. Carry out trimming and packaging to obtain the corresponding finished product of silica gel glove.

The obtained silica gel gloves are tested for corresponding performance. The test results showed that, the thickness of silica gel gloves are uniformly distributed. The problem of uneven thickness at the finger-palm joints and thumb-palm joint does not appear. However, there is some bumpy shape on the surface of glove, and the surface finishing is of poor quality.

The description of the preferred embodiments thereof serves only as an illustration of the scope of the invention.

It will be understood by those skilled in the art that various changes or supplements in form and details may be made therein without departing from the scope of the invention as defined by the appended claims.

While the present invention has been described in detail and cited with reference to specific embodiments thereof, it will be apparent to those skilled in the art that various changes and modifications may be made therein without departing from the spirit and scope of the invention.

LIST OF REFERENCE NUMERALS

1 Glove mold
11 Fingers portion
12 Palm side
13 Finger-palm joint
14 Thumb-palm joint

What is claimed is:

1. A method of manufacturing a silica gel glove, comprising:
    placing a palm side (12) of a glove mold (1) face up; moving the glove mold (1) forward with a production line and entering a pouring procedure;
    in the pouring procedure, raising a fingers portion (11) of the glove mold (1) up, in such a way that the glove mold (1) tilts up at 15°-45° relative to a horizontal position;
    pouring a first pour of silica gel slurry downwards at finger-palm joints (13) and a thumb-palm joint (14) at the fingers portion (11) of the glove mold (1);
    continue pouring a second pour of silica gel slurry on a glove mold surface to coat the whole glove mold surface with silica gel slurry to form a semi-finished glove while the glove mold (1) is adjusted to the horizontal position, the glove mold (1) rotating by using a lengthwise direction of the glove mold (1) as an axis of rotation, and the glove mold (1) continuing to move forward and entering a dripping procedure;
    advancing the semi-finished glove through a dripping procedure for dripping treatment;
    moving the glove mold (1) forward and placing the fingers portion (11) of the glove mold (1) upwards in an off-horizontal position, in such a way that the glove mold (1) tilts upward and forms an angle of 5°-15° with the horizontal position and maintains axial rotation, and then moving the glove mold (1) forward and entering a dry procedure; and
    in the dry procedure, returning the glove mold (1) to the horizontal position and vulcanizing and cooling the glove mold (1) to obtain a corresponding silica gel glove.

2. The method of manufacturing a silica gel glove according to claim 1 wherein the dripping procedure comprises:
    placing the fingers portion (11) of the glove mold (1) downwards in an off-horizontal position, in such a way that the glove mold (1) forms an angle of 40°-75° with the horizontal direction; and
    rotating the glove mold (1) using the lengthwise direction of the glove mold (1) as the axis of rotation, while allowing silica gel slurry to drip.

3. The method of manufacturing a silica gel glove according to claim 1, further comprising:
    after the dripping procedure, adjusting the glove mold (1) to the horizontal position;
    blowing compressed air to the semi-finished glove on the glove mold surface, in such a way that a compressed air blowing direction is perpendicular to the lengthwise direction of the glove mold (1); and
    rotating the glove mold (1) along the lengthwise direction of the glove mold (1), with the lengthwise direction of the glove mold (1) as the axis of rotation.

4. The method of manufacturing a silica gel glove according to claim 1 wherein
    a pouring temperature of silica gel slurry in step A is ≤40° C.

5. The method of manufacturing a silica gel glove according to claim 4 wherein the pouring temperature of silica gel slurry is 10° C.-40° C.

6. The method of manufacturing a silica gel glove according to claim 1 wherein
    a viscosity of the silica gel slurry is 2000 mPa·s-20000 mPa·s.

7. The method of manufacturing a silica gel glove according to claim 1, further comprising:
    prior to placing the palm side (12) of the glove mold (1) face up, covering the glove mold (1) with a glove lining;
    immersing the glove lining covered glove mold (1) in an anti-permeation liquid for anti-permeation treatment; and
    having the glove mold (1) enter into the next procedure after drying.

8. The method of manufacturing a silica gel glove according to claim 1, further comprising:
    after the dripping procedure, adjusting the glove mold (1) to the horizontal position;
    blowing compressed air to the semi-finished glove on the glove mold surface, in such a way that a compressed air blowing direction is perpendicular to the lengthwise direction of the glove mold (1); and
    rotating the glove mold (1) along the lengthwise direction of the glove mold (1), with the lengthwise direction of the glove mold (1) as the axis of rotation.

9. The method of manufacturing a silica gel glove according to claim 1, further comprising:
    prior to vulcanizing and cooling the glove mold (1), placing the fingers portion (11) of the glove mold (1) upwards in an off-horizontal position, in such a way that the glove mold (1) tilts upward and forms an angle of 5°-15° with the horizontal position.

10. The method of manufacturing a silica gel glove according to claim 3, further comprising:
    prior to vulcanizing and cooling the glove mold (1), placing the fingers portion (11) of the glove mold (1) upwards in an off-horizontal position, in such a way that the glove mold (1) tilts upward and forms an angle of 5°-15° with the horizontal position.

11. The method of manufacturing a silica gel glove according to claim 1, further comprising:
    prior to placing the palm side (12) of the glove mold (1) face up, covering the glove mold (1) with a glove lining;
    immersing the glove lining covered glove mold (1) in an anti-permeation liquid for anti-permeation treatment; and
    having the glove mold (1) enter into the next procedure after drying.

* * * * *